(12) United States Patent
Garza et al.

(10) Patent No.: US 12,475,691 B2
(45) Date of Patent: Nov. 18, 2025

(54) SYSTEM AND METHOD FOR OVERCOMING REAL-WORLD LOSSES IN MACHINE LEARNING APPLICATIONS

(71) Applicant: Southwest Research Institute, San Antonio, TX (US)

(72) Inventors: Harold A. Garza, San Antonio, TX (US); David R. Chambers, San Antonio, TX (US); Douglas A. Brooks, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 333 days.

(21) Appl. No.: 18/301,312

(22) Filed: Apr. 17, 2023

(65) Prior Publication Data

US 2023/0351737 A1 Nov. 2, 2023

Related U.S. Application Data

(60) Provisional application No. 63/363,733, filed on Apr. 28, 2022.

(51) Int. Cl.
*G06V 10/776* (2022.01)
*G06V 10/774* (2022.01)
(Continued)

(52) U.S. Cl.
CPC ........ *G06V 10/776* (2022.01); *G06V 10/7747* (2022.01); *G06V 10/7796* (2022.01); *G06V 10/82* (2022.01); *G06V 2201/02* (2022.01)

(58) Field of Classification Search
CPC ............. G06V 10/776; G06V 10/7747; G06V 10/7796; G06V 10/82; G06V 2201/02
(Continued)

(56) References Cited

U.S. PATENT DOCUMENTS

2020/0361082 A1 11/2020 Bai et al.
2021/0264268 A1 8/2021 Goswami et al.
(Continued)

FOREIGN PATENT DOCUMENTS

EP 3690726 8/2020

OTHER PUBLICATIONS

Liu, Bolin, Xiao Shu, and Xiaolin Wu. "Demoir\'eing of Camera-Captured Screen Images Using Deep Convolutional Neural Network." arXiv preprint arXiv:1804.03809 (2018). (Year: 2018).*
(Continued)

*Primary Examiner* — Jonathan S Lee
(74) *Attorney, Agent, or Firm* — Grossman, Tucker, Perreault & Pfleger, PLLC

(57) ABSTRACT

In an approach to integrating real-world properties into machine learning training, a real-world image is received. The real-world image is compared to a simulated image, where the comparison is performed using a discriminator network of a generative adversarial network (GAN). A generator network of the GAN is trained with results of the comparison of the real-world image to the simulated image. Responsive to determining that the real-world image is not optimal, the real-world image is iteratively tuned, using the generator network of the GAN, until it is determined that the real-world image is optimal, where the real-world image is optimal if the real-world image meets a predetermined threshold for accuracy of one or more image parameters of the simulated image versus the real-world image. The discriminator network of the GAN is trained with the real-world image.

20 Claims, 5 Drawing Sheets

(51) Int. Cl.
*G06V 10/778* (2022.01)
*G06V 10/82* (2022.01)

(58) Field of Classification Search
USPC .......................................................... 382/157
See application file for complete search history.

(56) References Cited

U.S. PATENT DOCUMENTS

2021/0304402 A1  9/2021  Morgas et al.
2021/0334459 A1  10/2021  Dvigotham et al.

OTHER PUBLICATIONS

Pai, Sharan, et al. "User input based style transfer while retaining facial Attributes." 2019 IEEE Fifth International Conference on Multimedia Big Data (BigMM). IEEE, 2019. (Year: 2019).*

Ki, Sehwan, et al. "Fully end-to-end learning based conditional boundary equilibrium gan with receptive field sizes enlarged for single ultra-high resolution image dehazing." Proceedings of the IEEE Conference on Computer Vision and Pattern Recognition Workshops. 2018. (Year: 2018).*

Feng, Jiangfan, and Shuang Qi. "Motion deblurring in image color enhancement by WGAN." International Journal of Optics 2020.1 (2020): 1295028. (Year: 2020).*

Dai, Peng, et al. "Video Demoireing with Relation-Based Temporal Consistency." arXiv preprint arXiv:2204.02957 (2022). (Year: 2022).*

Bansal et al., Recycle-GAN: Unsupervised Video Retargetting, 2018, Pittsburgh, PA, pp. 1-17.

Isola et al., "Image-to-Image Translation with Conditional Adversarial Networks", Berkeley, CA, 2018, pp. 1-17.

Shrivastava et al., "Learning from Simulated and Unsupervised Images through Adversarial Training", 2016, pp. 1-16.

* cited by examiner

SYSTEM AND METHOD FOR OVERCOMING REAL-WORLD LOSSES IN MACHINE LEARNING APPLICATIONS

CROSS-REFERENCE TO RELATED APPLICATIONS

The present application claims the benefit of the filing date of U.S. Provisional Application Ser. No. 63/363,733, filed Apr. 28, 2022, the entire teachings of which application is hereby incorporated herein by reference.

FIELD

The present application relates generally to machine learning and, more particularly, to overcoming real-world losses in machine learning applications.

BACKGROUND

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving. Machine learning (ML) is an application of AI that creates systems that have the ability to automatically learn and improve from experience.

Adversarial learning, a subfield to machine learning, generates patterns that can be viewed by a trained machine learning model to induce an irregular response. It is necessary to understand the vulnerabilities of machine learning models so that cybersecurity professionals can mitigate attacks against real systems. It is pertinent to understand the ramifications of these responses, and thus necessary to create and test these attacks against models. Testing attacks that could occur in the real world requires accurate display of these patterns in comparison to the trained model (e.g., similar attributes such as color and brightness).

BRIEF DESCRIPTION OF THE DRAWINGS

Reference should be made to the following detailed description which should be read in conjunction with the following figures, wherein like numerals represent like parts.

DETAILED DESCRIPTION

Figure 1:
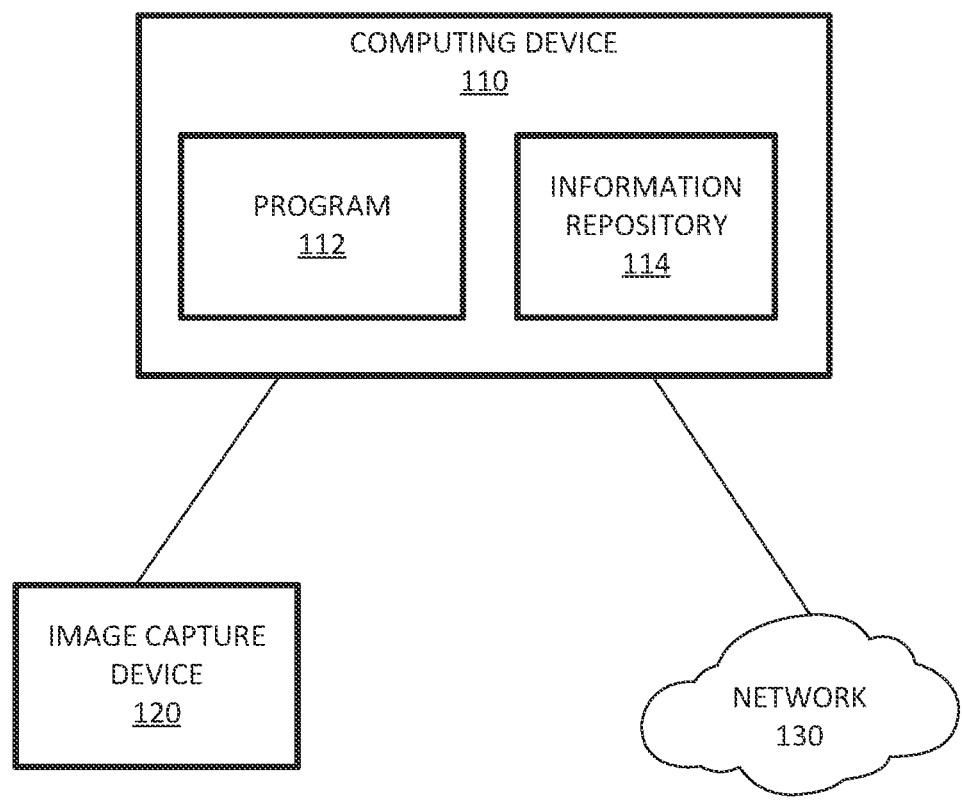
FIG. 1 is a functional block diagram illustrating a distributed data processing environment consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Machine learning (ML) is an application of AI that creates systems that have the ability to automatically learn and improve from experience. ML involves the development of computer programs that can access data and learn based on that data. ML algorithms typically build mathematical models based on sample, or training, data in order to make predictions or decisions without being explicitly programmed to do so. The use of training data in ML requires human intervention for feature extraction in creating the training data set. The two main types of ML are Supervised learning and Unsupervised learning. Supervised learning uses labeled datasets that are designed to train or "supervise" algorithms into classifying data or predicting outcomes accurately. Supervised learning is typically used for problems requiring classification or regression analysis. Classification problems use an algorithm to accurately assign test data into specific categories. Regression is a method that uses an algorithm to understand the relationship between dependent and independent variables. Regression models are helpful for predicting numerical values based on different data points. Unsupervised learning uses machine learning algorithms to analyze and cluster unlabeled datasets. These algorithms discover hidden patterns or data groupings without the need for human intervention, and their ability to discover similarities and differences in information make unsupervised learning the ideal solution for exploratory data analysis, cross-selling strategies, customer segmentation, and image recognition.

Adversarial Learning, a subfield to machine learning, generates patterns that can be viewed by a trained machine learning model to induce an irregular response. It is necessary to understand the vulnerabilities of machine learning models so that, for example, cybersecurity professionals can mitigate attacks against real systems. In another example, the irregular response may be a misidentification of a person or an object. It is pertinent to understand the ramifications of these responses, and thus necessary to create and test these attacks against models. Testing attacks that could occur in the real world requires accurate display of these patterns in comparison to the trained model (e.g., similar attributes such as color and brightness).

A generative adversarial network (GAN) is a class of machine learning where two neural networks contest with each other. The GAN is comprised of generator and discriminator networks. The generator learns to generate plausible data. The generated instances become negative training examples for the discriminator. The discriminator in a GAN is typically a classifier that learns to distinguish the generator's fake data from real data. Given a training set, this technique learns to generate new data with the same statistics as the training set. For example, a GAN trained on photographs can generate new photographs that look at least superficially authentic to human observers, having many realistic characteristics. The core idea of a GAN is based on the "indirect" training through the discriminator, another neural network that is able to tell how much an input is "realistic", which itself is also being updated dynamically. This basically means that the generator is not trained to minimize the distance to a specific image, but rather to fool the discriminator. This enables the model to learn in an unsupervised manner.

Currently, most machine learning models are trained on pre-captured data, and for adversarial learning, a digital pattern is overlayed onto the image which is then "trained" repeatedly. However, several issues become apparent once this digital pattern is printed and tested in front of a real camera, including uncontrollable environmental lighting and subpar printer quality used to print out the pattern. These issues compound and become difficult to accurately model during training, and there are no straightforward objective functions which help to solve these issues. These losses can be visualized in the example of FIG. 2 below.

For these patterns to exploit object detection neural networks in a real-world environment, they require accurate color representation. One problem is that due to losses during printing (e.g., imperfect color representation when transitioning from typical screen red green blue [RGB] color space to typical printer cyan magenta yellow black [CMYK] color space), losses during display on an electronic display device, e.g., a liquid crystal display (LCD), a light-emitting diode (LED) display, or an electrophoretic, i.e., e-ink, display, and losses during live capture (e.g., glare from the sun on the glossy poster material), it is too complex to model and account for these losses in a simulated training environment.

In some embodiments, different GAN architectures may be used to generate a synthetic pattern which would then be displayed on an image display device. An image capture device captures another image (now with the display showing the synthetic pattern), and the generator network extracts several fake subsamples. The discriminator network is then fed both the real and fake subsamples. Depending on which architecture is used, the losses are used to generate the gradients for backpropagation, which train the weights of the neural networks.

In some embodiments, the GAN is a modified version of the Boundary Equilibrium GAN (BEGAN). This architecture forces the generator and discriminator networks into equilibrium and balances them during training using a derivation of the Wasserstein Distance. This architecture is unique because it uses autoencoders for both the generator and discriminator networks, and measures the loss based on the distributions generated by both.

In some other embodiments, the GAN architecture is a modified version of the Wasserstein GAN with Gradient Penalty (WGAN-GP). This architecture uses a ratio, $n_{critic}$, which is a hyperparameter that specifies how many iterations the discriminator network should perform gradient descent for each time the generator network performs gradient descent. The rationale is that typically the task of the discriminator network is more difficult than the task of the generator network, and thus the former typically requires more optimization than the latter.

Figure 2:
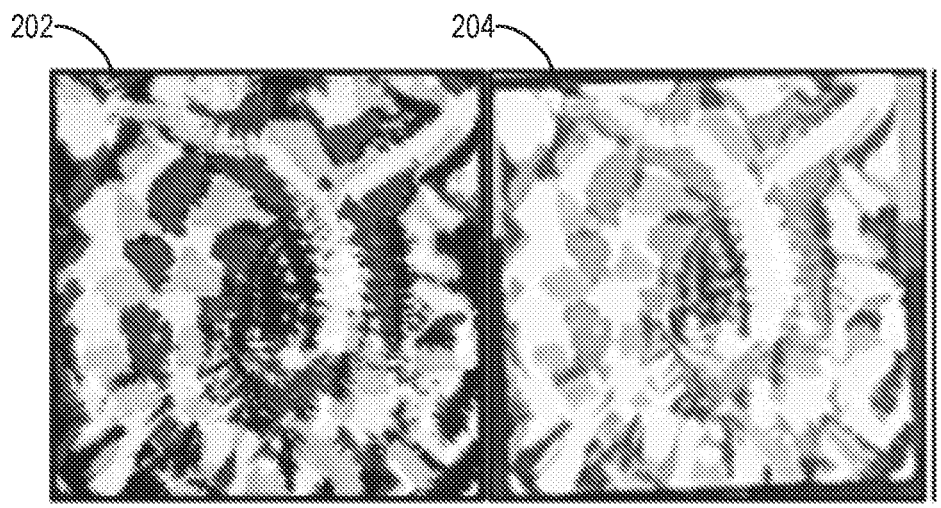
FIG. 2 is an example of a simulated adversarial image versus a real-world adversarial image.

FIG. 2 is an example of a simulated adversarial image versus a real-world adversarial image. Simulated adversarial image 202 is an example of an image as generated by an adversarial learning system. Real-world adversarial image 204 is an example of the simulated adversarial image 202 when it is displayed on a real-world device, e.g., a display output or a printed image. Disclosed herein is a system and a computer-implemented method for overcoming real-world losses in machine learning applications by training neural networks to generate optimal patterns by directly training in the real-world environment in which it will be tested, integrating the real-world properties of displays, environments, sensors, etc.

Another example of a simulated adversarial image versus a real-world adversarial image is in adaptive camouflage. Adversarial learning software can use a wide range of colors and patterns to generate realistic camouflage, but it requires knowing exactly what to account for (e.g., light sources, printer losses) to be successful. The disclosed system and computer-implemented method for overcoming real-world losses in machine learning applications may be used as an end-to-end training process for creating and tuning camouflage patterns. This method greatly increases the effectiveness of the pattern in real-world environments by optimizing over all the losses that one would typically have when using conventional training methods. While GANs have been used to mask and mimic individuals in video recordings, this is the first time GANs have been used to develop optimized camouflage for a given background environment. In addition, the disclosed system and method is able to implement the end-to-end training method on both color Electronic electrophoretic displays as well as LED monitor displays.

Figure 3:
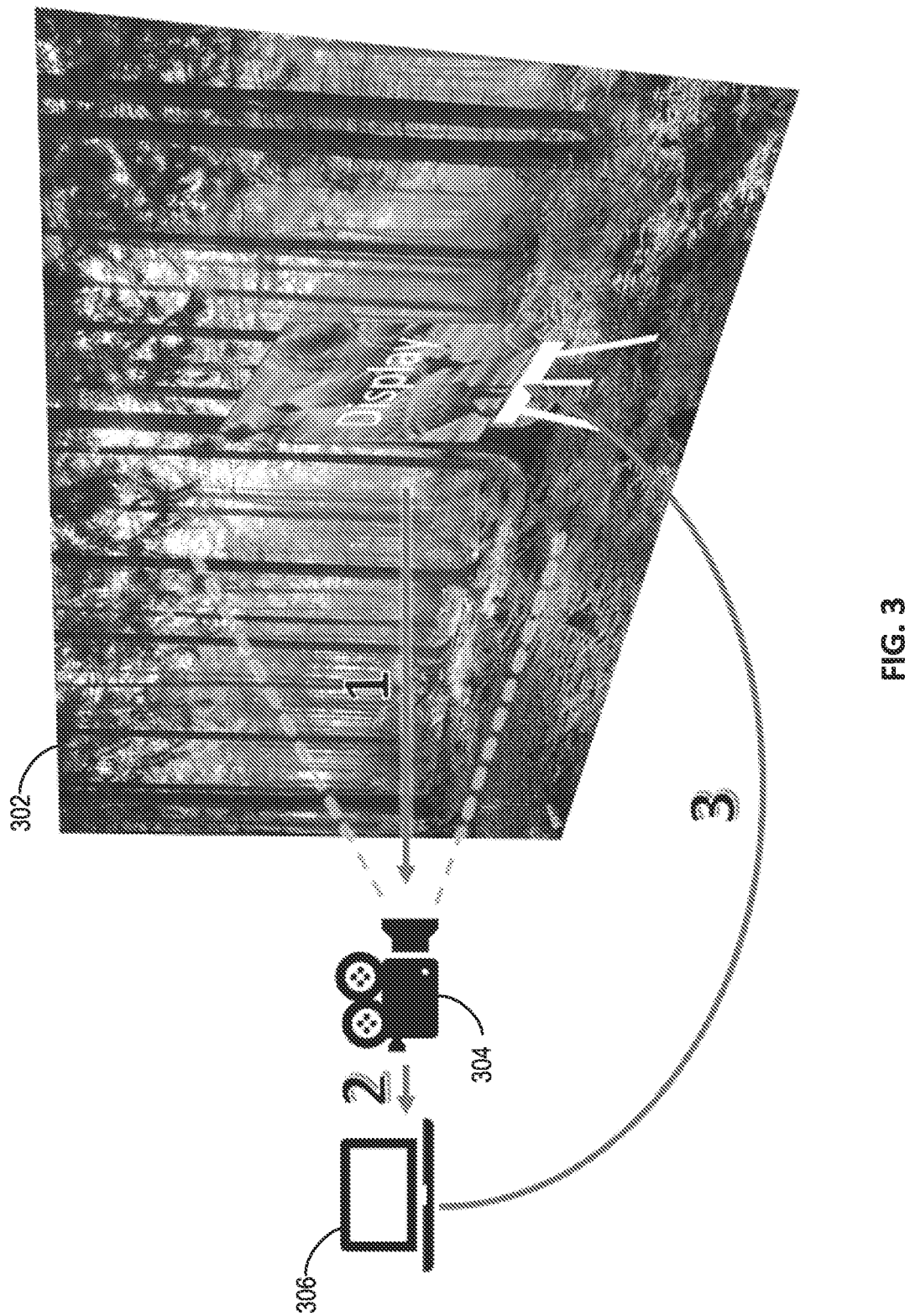
FIG. 3 is an example overview of the process for overcoming real-world losses in machine learning applications consistent with the present disclosure.

FIG. 3 is an example overview of the process for overcoming real-world losses in machine learning applications consistent with the present disclosure. The example of FIG. 3 shows only one image display device, image display device 302, although in other embodiments any number of image display device may be used. In some embodiments, image display device 302 may be a display such as an LED display, an LCD display, or an electrophoretic display. In some other embodiments, image display device 302 may be a printed image, or the printer used to generate the printed image.

The example of FIG. 3 shows only one image capture device, image capture device 304, although in other embodiments any number of image capture devices may be used. Image capture device 304 captures an image displayed by image display device 302 and sends the image to computer 306. Computer 306 uses the image received from image capture device 304 to train a GAN comprised of generator and discriminator networks. The generator network receives an image from the image capture device and randomly subsamples it to get pieces of the overall environment. It then generates a pattern, which is sent on to the updateable display. Once the display has been updated, the discriminator network then receives another image from the image capture device and randomly chooses subsamples from the new image that contains a predetermined pixel amount of the display. The general task of the discriminator network is to determine which subsamples contain only the real-world environment (real images) and which subsamples contain some (or all) of the pattern display (fake images). The task of the discriminator network is to continuously improve its ability to discriminate between fake and real images, while the task of the generator network is to continuously improve its ability to fool the discriminator network.

FIG. 1 is a functional block diagram illustrating a distributed data processing environment, generally designated 100, suitable for operation of program 112, consistent with the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes computing device 110 optionally connected to network 130. Network 130 can be, for example, a telecommunications network, a Local Area Network (LAN), a Wide Area Network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a Personal Computer (PC), a desktop computer, or any programmable electronic device capable of communicating with other computing devices (not shown) within distributed data processing environment 100 via network 130. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In some embodiments, computing device 110 includes program 112. In an embodiment, program 112 is a program, application, or subprogram of a larger program for overcoming real-world losses in machine learning applications. In an alternative embodiment, program 112 may be located on any other device accessible by computing device 110 via network 130.

In some embodiments, computing device 110 includes information repository 114. In an embodiment, information repository 114 may be managed by program 112. In an alternate embodiment, information repository 114 may be managed by the operating system of the computing device 110, alone, or together with, program 112. Information repository 114 is a data repository that can store, gather, compare, and/or combine information. In some embodiments, information repository 114 is located externally to computing device 110 and accessed through a communication network, such as network 130. In some embodiments, information repository 114 is stored on computing device 110. In some embodiments, information repository 114 may reside on another computing device (not shown), provided that information repository 114 is accessible by computing device 110. Information repository 114 includes, but is not limited to, AI data, learning data, process data, and other data that is received by program 112 from one or more sources, and data that is created by program 112.

Information repository 114 may be implemented using any non-transitory volatile or non-volatile storage media for storing information, as known in the art. For example, information repository 114 may be implemented with Random-Access Memory (RAM), Solid-State Drives (SSD), one or more independent hard disk drives, multiple hard disk drives in a Redundant Array of Independent Disks (RAID), optical library, or a tape library. Similarly, information repository 114 may be implemented with any suitable storage architecture known in the art, such as a relational database, an object-oriented database, or one or more tables.

In some embodiments, distributed data processing environment 100 includes one or more image capture devices, e.g., image capture device 120 of FIG. 1. Image capture device may be a still camera, a video camera, or any other device capable of capturing an image and transmitting the image to computing device 110. In some embodiments, image capture device 120 is directly connected to computing device 110. In some other embodiments, image capture device 120 connects to computing device 110 through network 130.

Figure 4:
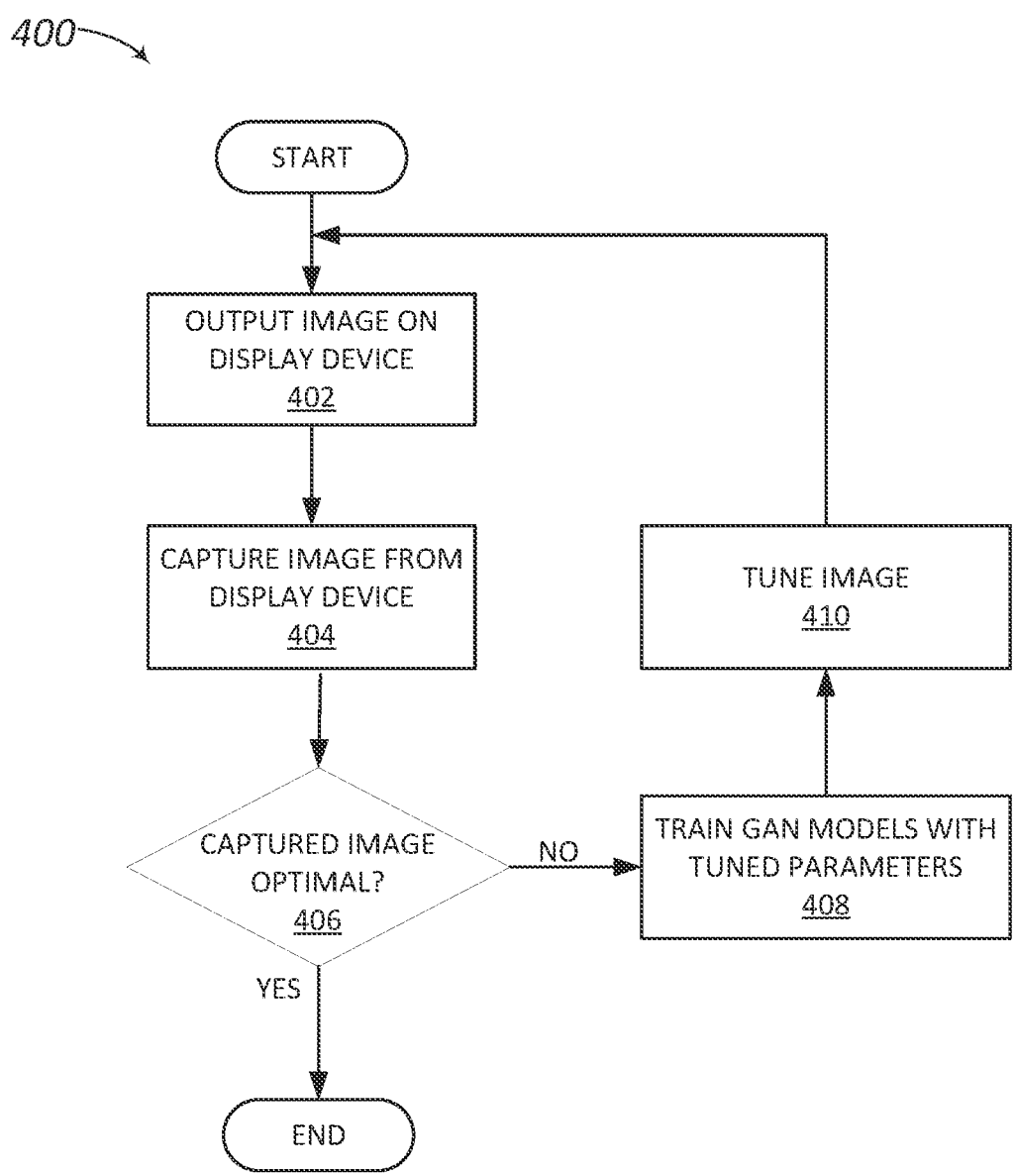
FIG. 4 is a flowchart diagram depicting operations for the program for overcoming real-world losses in machine learning applications, on the distributed data processing environment of FIG. 1, consistent with the present disclosure.

FIG. 4 is a flowchart diagram depicting operations for the program 112 for overcoming real-world losses in machine learning applications, on the distributed data processing environment of FIG. 1, consistent with the present disclosure. In an alternative embodiment, the operations of workflow 400 may be performed by any other program while working with the program 112.

It should be appreciated that embodiments of the present disclosure provide at least for overcoming real-world losses in machine learning applications. However, FIG. 4 provides only an illustration of one implementation and does not imply any limitations with regard to the environments in which different embodiments may be implemented. Many modifications to the depicted environment may be made by those skilled in the art without departing from the scope of the disclosure as recited by the claims.

The program 112 outputs an image on the image display device (operation 402). In one example embodiment, the program 112 outputs a simulated adversarial image on the image display device, e.g., the image display device 302 from FIG. 3. In some embodiments, the image display device may be an LCD, LED, or electrophoretic display. In some other embodiments, the image display device may be a hard copy image, such as an image printed on a printer device.

The program 112 captures the image from the image display device (operation 404). In operation 403B, the program 112 uses an image capture device, e.g., image capture device 120 from FIG. 1, to capture a real-world adversarial image of the simulated adversarial image on the image display device.

The program 112 determines if the captured image is optimal (decision block 406). The program 112 determines if the captured image is optimal, i.e., if the captured image meets a predetermined threshold for accuracy of one or more image parameters of the simulated adversarial image versus the real-world adversarial image, as described above.

In some embodiments, the image display device is a computer monitor. In these embodiments, the one or more image parameters may include, but are not limited to, brightness (or luminance), color gamut (a range of colors within the spectrum of colors, or a color space, that can be reproduced on an output device), resolution, contrast, color temperature, and viewing direction. In some other embodiments, the image display device may be a printed image. In these embodiments, the one or more image parameters may include, but is not limited to, color space, i.e., the conversion from the RGB (red, green, and blue) color space of a display versus the CMYK (cyan, magenta, yellow, and black) color space of a printer. Generally, the CMYK color space of a printer is very small compared to the RGB color space of a color monitor. When the real-world adversarial image is a printed image, matching it to the desired simulated adversarial image is difficult.

In order to determine if the captured image is optimal, one or more image parameters and predetermined thresholds for these image parameters are chosen in advance. When the real-world adversarial image is received, the program 112 will use the discriminator network of the GAN to determine if the one or more image parameters are within the predetermined thresholds. If the discriminator network determines that the parameters are within the predetermined thresholds, then the image is considered real, and the process is complete. If the discriminator network determines that the parameters are not within the predetermined thresholds, then the image is considered fake, and the process continues to tune the image.

If the program 112 determines that the captured image is optimal ("yes" branch, decision block 406), then the program 112 ends for this cycle. If the program 112 determines that the captured image is not optimal ("no" branch, decision block 406), then the program 112 proceeds to operation 408 to update the GAN models.

The program 112 trains the GAN models with the tuned parameters (operation 408). In operation 408, the program 112 trains the generator network with the output of the discriminator network and trains the discriminator network with the output of the generator network, thereby updating the GAN models with updated image parameters to use in tuning the real-world image in operation 410.

The program 112 tunes the image (operation 410). In operation 410, the program 112 uses the generator network of the GAN to tune the real-world adversarial image based on the results from the discriminator network of the GAN from decision block 406. The program 112 then generates a tuned image to display on the image display device. The program 112 then returns to operation 402 to output the tuned image on the image display device.

Figure 5:
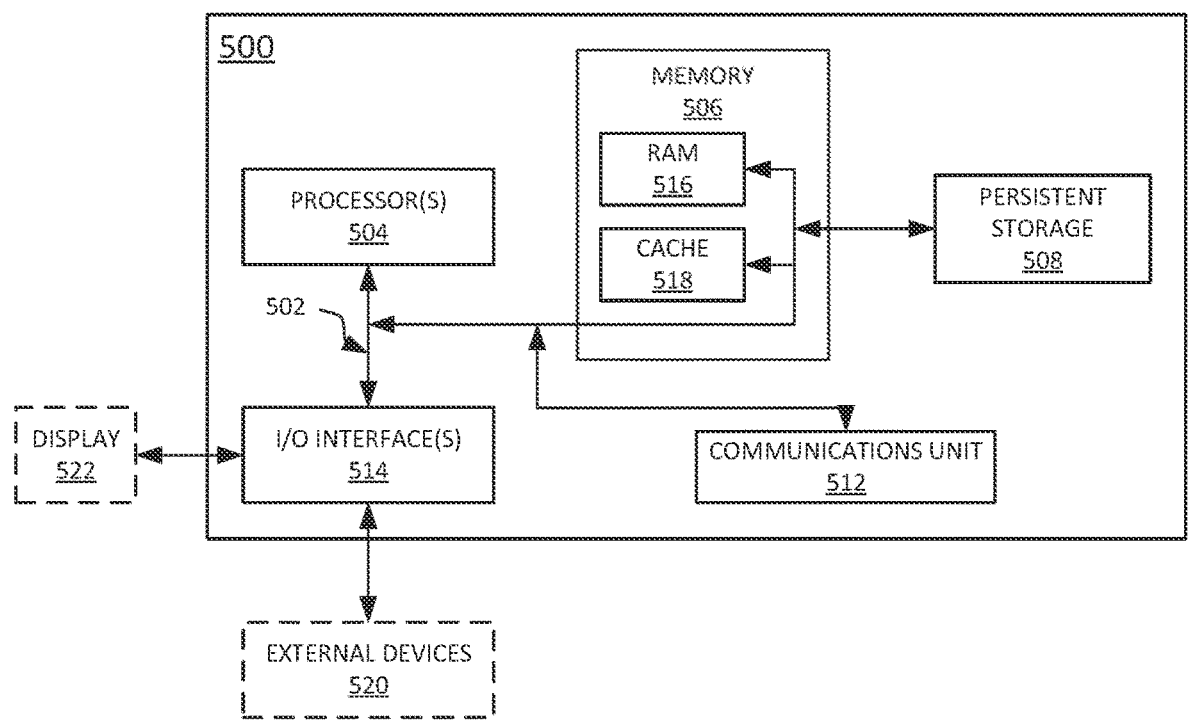
FIG. 5 depicts a block diagram of components of the computing device executing the program within the distributed data processing environment of FIG. 1, consistent with the present disclosure.

FIG. 5 is a block diagram depicting components of one example 500 of the computing device 102 suitable for program 112, within the distributed data processing environment of FIG. 1, consistent with the present disclosure. FIG. 5 displays the computing device or computer 500, one or more processor(s) 504 (including one or more computer processors), a communications fabric 502, a memory 506 including, a random-access memory (RAM) 516 and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present disclosure, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present disclosure, e.g., program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

According to one aspect of the disclosure, there is provided a computer-implemented method for the detection of malicious activity. The computer-implemented method includes: receiving a real-world image; comparing the real-world image to a simulated image, wherein comparing the real-world image to the simulated image is performed using a discriminator network of a generative adversarial network (GAN); training a generator network of the GAN with results of comparing the real-world image to the simulated image; responsive to determining that the real-world image is not optimal, iteratively tuning the real-world image, using the generator network of the GAN, until determining that the real-world image is optimal, wherein the real-world image is optimal if the real-world image meets a predetermined threshold for accuracy of one or more image parameters of the simulated image versus the real-world image; and training the discriminator network of the GAN with the real-world image.

According to another aspect of the disclosure, there is provided a system for the detection of malicious activity. The system includes: one or more computer processors; one or more computer readable storage media; and program instructions stored on the one or more computer readable storage media for execution by at least one of the one or more computer processors, the stored program instructions including instructions to: receive a real-world image; compare the real-world image to a simulated image, wherein comparing the real-world image to the simulated image is performed using a discriminator network of a generative adversarial network (GAN); train a generator network of the GAN with results of comparing the real-world image to the simulated image; responsive to determining that the real-world image is not optimal, iteratively tune the real-world image, using the generator network of the GAN, until determining that the real-world image is optimal, wherein the real-world image is optimal if the real-world image meets a predetermined threshold for accuracy of one or more image parameters of the simulated image versus the real-world image; and train the discriminator network of the GAN with the real-world image.

According to yet another aspect of the disclosure, there is provided a system for the detection of malicious activity. The system includes: one or more image display devices; one or more image capture devices; one or more computer processors; one or more computer readable storage media; and program instructions stored on the one or more computer readable storage media for execution by at least one of the one or more computer processors, the stored program instructions including instructions to: capture a simulated image from any of the one or more image display devices using any of the one or more image capture devices; receive a real-world image; compare the real-world image to the simulated image, wherein comparing the real-world image to the simulated image is performed using a discriminator network of a generative adversarial network (GAN); train a generator network of the GAN with results of comparing the real-world image to the simulated image; responsive to determining that the real-world image is not optimal, iteratively tune the real-world image, using the generator network of the GAN, until determining that the real-world image is optimal, wherein the real-world image is optimal if the real-world image meets a predetermined threshold for accuracy of one or more image parameters of the simulated image versus the real-world image; and train the discriminator network of the GAN with the real-world image.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a non-transitory computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for overcoming real-world losses in machine learning applications comprising:
   receiving, by one or more computer processors, a real-world image;
   comparing, by the one or more computer processors, the real-world image to a simulated image of the real-world image, wherein comparing the real-world image to the simulated image of the real-world image is performed using a discriminator network of a generative adversarial network (GAN);
   training, by the one or more computer processors, a generator network of the GAN with results of comparing the real-world image to the simulated image of the real-world image;
   responsive to determining that the real-world image is not optimal, iteratively tuning, by the one or more computer processors, the real-world image, using the generator network of the GAN, until determining that the real-world image is optimal, wherein the real-world image is optimal if the real-world image meets a predetermined threshold for accuracy of one or more image parameters of the simulated image of the real-world image versus the real-world image; and
   training, by the one or more computer processors, the discriminator network of the GAN with the real-world image.

2. The computer-implemented method of claim 1, wherein responsive to determining that the real-world image is not optimal, iteratively tuning the real-world image, using the generator network of the GAN, until determining that the real-world image is optimal, further comprises:
   receiving, by the one or more computer processors, the one or more image parameters of the simulated image from a user to determine if the real-world image is optimal;
   determining, by the one or more computer processors, whether the real-world image meets the predetermined threshold for accuracy for each of the one or more image parameters of the simulated image versus the real-world image using the discriminator network of the GAN; and
   responsive to determining that the real-world image meets the predetermined threshold for accuracy of the one or more image parameters of the simulated image versus the real-world image, determining, by the one or more computer processors, that the real-world image is optimal.

3. The computer-implemented method of claim 1, wherein the GAN is a modified version of a Boundary Equilibrium GAN (BEGAN).

4. The computer-implemented method of claim 1, wherein receiving the real-world image comprises:
   capturing, by the one or more computer processors, the real-world image using an image capture device, wherein the image capture device captures the real-world image from an image display device.

5. The computer-implemented method of claim 4, wherein the image display device is chosen from a group consisting of a liquid crystal display (LCD), a light-emitting diode (LED) display, an electrophoretic display, and a printed image.

6. The computer-implemented method of claim 4, wherein the image capture device is a video camera.

7. The computer-implemented method of claim 4, wherein the image capture device is a still camera.

8. The computer-implemented method of claim 1, wherein the one or more image parameters of the simulated image of the real-world image includes at least one of brightness, luminance, color gamut, resolution, contrast, color temperature, color space, and viewing direction.

9. A system for overcoming real-world losses in machine learning applications, the system comprising:
  one or more computer processors;
  one or more computer readable storage media; and
  program instructions stored on the one or more computer readable storage media for execution by at least one of the one or more computer processors, the stored program instructions including instructions to:
  receive a real-world image;
  compare the real-world image to a simulated image of the real-world image, wherein comparing the real-world image to the simulated image of the real-world image is performed using a discriminator network of a generative adversarial network (GAN);
  train a generator network of the GAN with results of comparing the real-world image to the simulated image of the real-world image;
  responsive to determining that the real-world image is not optimal, iteratively tune the real-world image, using the generator network of the GAN, until determining that the real-world image is optimal, wherein the real-world image is optimal if the real-world image meets a predetermined threshold for accuracy of one or more image parameters of the simulated image of the real-world image versus the real-world image; and
  train the discriminator network of the GAN with the real-world image.

10. The system of claim 9, wherein determining whether the real-world image is optimal, based on comparing the real-world image to the simulated image, further comprises one or more of the following program instructions, stored on the one or more computer readable storage media, to:
  receive the one or more image parameters of the simulated image from a user to determine if the real-world image is optimal;
  determine whether the real-world image meets the predetermined threshold for accuracy for each of the one or more image parameters of the simulated image versus the real-world image using the discriminator network of the GAN; and
  responsive to determining that the real-world image meets the predetermined threshold for accuracy of the one or more image parameters of the simulated image versus the real-world image, determine that the real-world image is optimal.

11. The system of claim 9, wherein the GAN is a modified version of a Boundary Equilibrium GAN (BEGAN).

12. The system of claim 9, wherein the GAN is a modified version of a Wasserstein GAN with Gradient Penalty (WGAN-GP).

13. The system of claim 9, wherein receiving the real-world image comprises one or more of the following program instructions, stored on the one or more computer readable storage media, to comprises:
  capture the real-world image using an image capture device, wherein the image capture device captures the real-world image from an image display device.

14. The system of claim 13, wherein the image display device is chosen from a group consisting of a liquid crystal display (LCD), a light-emitting diode (LED) display, an electrophoretic display, and a printed image.

15. A system for overcoming real-world losses in machine learning applications, the system comprising:
  one or more image display devices;
  one or more image capture devices;
  one or more computer processors;
  one or more computer readable storage media; and
  program instructions stored on the one or more computer readable storage media for execution by at least one of the one or more computer processors, the stored program instructions including instructions to:
  capture a simulated image of a real-world image from any of the one or more image display devices using any of the one or more image capture devices;
  receive the real-world image;
  compare the real-world image to the simulated image of the real-world image, wherein comparing the real-world image to the simulated image of the real-world image is performed using a discriminator network of a generative adversarial network (GAN);
  train a generator network of the GAN with results of comparing the real-world image to the simulated image of the real-world image;
  responsive to determining that the real-world image is not optimal, iteratively tune the real-world image, using the generator network of the GAN, until determining that the real-world image is optimal, wherein the real-world image is optimal if the real-world image meets a predetermined threshold for accuracy of one or more image parameters of the simulated image of the real-world image versus the real-world image; and
  train the discriminator network of the GAN with the real-world image.

16. The system of claim 15, wherein responsive to determining that the real-world image is not optimal, iteratively tune the real-world image, using the generator network of the GAN, until determining that the real-world image is optimal, further comprises one or more of the following program instructions, stored on the one or more computer readable storage media, to:
  receive the one or more image parameters of the simulated image from a user to determine if the real-world image is optimal;
  determine whether the real-world image meets the predetermined threshold for accuracy for each of the one or more image parameters of the simulated image versus the real-world image using the discriminator network of the GAN; and
  responsive to determining that the real-world image meets the predetermined threshold for accuracy of the one or more image parameters of the simulated image versus the real-world image, determine that the real-world image is optimal.

17. The system of claim 15, wherein the GAN is a modified version of a Boundary Equilibrium GAN (BEGAN).

18. The system of claim 15, wherein the GAN is a modified version of a Wasserstein GAN with Gradient Penalty (WGAN-GP).

19. The system of claim 15, wherein each of the one or more image display devices is chosen from a group consisting of a liquid crystal display (LCD), a light-emitting diode (LED) display, an electrophoretic display, and a printed image.

20. The system of claim 15, wherein any of the one or more image capture devices is chosen from a group consisting of a video camera and a still camera.

* * * * *